United States Patent Office 2,948,732
Patented Aug. 9, 1960

2,948,732
N-HETEROCYCLIC COMPOUNDS

Walter Schindler, Riehen, near Basel, and Franz Häfliger, Basel, Switzerland, assignors to Geigy Chemical Corporation, Ardsley, N.Y., a corporation of Delaware No Drawing. Filed Dec. 11, 1958, Ser. No. 779,558

Claims priority, application Switzerland Dec. 20, 1957

6 Claims. (Cl. 260—294.3)

The present invention concerns new N-heterocyclic compounds having valuable pharmacological properties and which in addition can be used as intermediate products for valuable substances, as well as a process for the production of these compounds.

N-substituted azepines and dihydro-azepines of the general formula

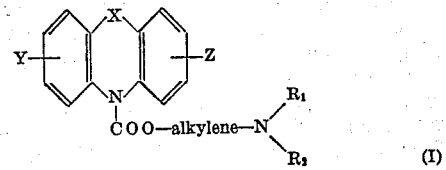

wherein X represents the ethylene or vinylene group, —$CH_2$—$CH_2$— or —CH=CH—, Y and Z represent hydrogen or halogen atoms, $R_1$ and $R_2$ represent low molecular alkyl radicals which can be bound to each other direct or by way of an oxygen atom, and alkylene represents an alkylene radical having 2 to 4 carbon atoms, as well as their salts and quaternary ammonium compounds have not been known up to now.

It has now been found that these compounds have pharmacologically valuable properties, in particular spasmolytic and antiallergic activity.

The new compounds according to the present invention can be produced by reacting 5-halogen carbonyl azepines or -dihydro azepines of the general formula

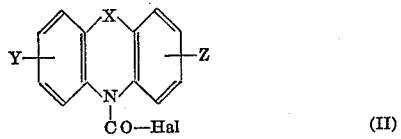

wherein Hal represents chlorine or bromine and X, Y and Z have the meanings given above, with amino alcohols of the general formula

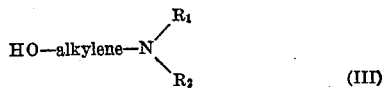

wherein $R_1$ and $R_2$ have the meanings given above and if desired, converting the reaction products into their salts by treatment with inorganic or organic acids, or converting the reaction products into quaternary ammonium compounds by reacting with reactive esters of aliphatic or araliphatic alcohols.

The reactions of the halogen carbonyl compounds with the amino alcohols can be performed, for example, by heating the components in an inert organic solvent, e.g. benzene or toluene. Also, instead of the free amino alcohols, the alkali compounds thereof can be used and, in this case, the reactions are performed at even room temperature.

The starting materials of the general Formula II can be obtained from 10.11-dihydro-5-dibenzo[b.f]azepine, 5-dibenzo[b.f]azepine or the C-substitution products thereof by reacting with phosgene or carbonic acid dibromide in an inert organic solvent such as, for example, benzene or toluene. The 5-dibenzo[b.f]azepine and the C-substitution products thereof are obtained from the corresponding 10.11-dihydro-5-dibenzo[b.f]azepines by N-acylating, brominating in the 10-position by means of bromosuccinimide and successively or simultaneously splitting off hydrogen bromide, and then hydrolyzing, for example, with alkali lyes. Examples of starting materials apart from 5-chlorocarbonyl derivatives of the 10.11-dihydro-5-dibenzo[b.f]azepine and 5-dibenzo[b.f]azepine named above, which can also be termed as 5-chlorocarbonyl-iminodibenzyl and 5-chlorocarbonyl-iminostilbene, are the 5-chlorocarbonyl derivatives of 1.9-dichloro- and 3.7-dichloro-10.11-dihydro-5-dibenzo[b.f]azepine (1.9- or 3.7-dichloro-iminodibenzyl); as well as of 1.9-dichloro- and 3.7-dichloro-5-dibenzo[b.f]azepine (1.9-dichloro- and 3.7-dichloro-iminostilbene).

Suitable amino alcohols of the general Formula III are, for example, dimethylaminoethanol, β-dimethylaminopropanol, γ-dimethylaminopropanol, β-dimethylamino-isopropanol, δ-dimethylamino-butanol, diethylamino ethanol, γ-diethylaminopropanol, β-(di-n-propylamino)-ethanol, β-(N-butylmethylamino)-ethanol, pyrrolidino ethanol, γ-pyrrolidino propanol, piperidino ethanol, γ-piperidino propanol and morpholino ethanol.

The tertiary basic esters form salts with inorganic or organic acids such as hydrochloric acid, hydrobromic acid, sulphuric acid, phosphoric acid, methane sulphonic acid, ethane disulphonic acid, acetic acid, succinic acid, fumaric acid, maleic acid, malic acid, tartaric acid, citric acid, benzoic acid and phthalic acid. Some of the salts are water soluble.

On reacting the tertiary basic esters with reactive esters, in particular halides or sulphates of aliphatic or araliphatic alcohols, e.g. of methyl iodide, dimethyl sulphate, ethyl bromide, ethyl iodide, diethyl sulphate, n-propyl bromide, n-butyl bromide, allyl bromide, allyl iodide, benzyl chloride, benzyl bromide or p-chlorobenzyl chloride, quaternary ammonium compounds are formed which are distinguished in particular by spasmolytic activity.

The compounds according to the present invention, when used as mental drugs, may be administered perorally in doses of 20 to 30 mg. five to ten times daily for adults. The same dosage may also be administered parenterally, e.g. intramuscularly.

The following examples serve to illustrate the production of the new compounds. Parts are given as parts by weight and their relationship to parts by volume is as that of grammes to cubic centimetres. The temperatures are in degrees centigrade.

Example 1

78 parts of iminodibenzyl are dissolved in 100 parts by volume of abs. toluene and a solution of 20 parts of phosgene in 100 parts by volume of toluene is added dropwise while stirring at 0°. The reaction mixture is then stirred for 10 hours at 0° and for 12 hours at room temperature. The precipitated iminodibenzyl hydrochloride is filtered off under suction, washed thoroughly with toluene and the filtrate is concentrated in the vacuum whereupon 5-chlorocarbonyl-iminodibenzyl crystallises out. It melts at 119–120°.

12.2 parts of this chloride are dissolved in 50 parts by volume of abs. benzene and added dropwise at 60–70° to a solution of 10 parts of dimethylamino ethanol in 50 parts by volume of abs. benzene. The reaction mixture is then boiled under reflux for 16 hours. After cooling, the basic portions are extracted with 2 N-hydrochloric acid, the acid solution is made alkaline with concentrated caustic soda lye and the precipitated base is taken up in petroleum ether. After drying the solution with sodium sulphate it is concentrated to a small volume whereupon 5-(carbo-dimethylaminoethoxy)-iminodibenzyl (10.11-dihydro-dibenzo[b.f]azepine-5-carboxylic acid dimethylaminoethyl ester) crystallises out. It melts at 76–77°.

Starting from 3.7-dichloriminodibenzyl, phosgene and γ-dimethylamino propanol, 3.7-dichloro-5-(carbo-γ-dimethylaminopropoxy)-iminodibenzyl (3.7-dichloro-10.11-dihydro-5-dibenzol[b.f]azepine - 5 - carboxylic acid-γ-dimethylamino propyl ester) is obtained in an analogous manner. On distilling the oil which separates out of the hydrochloric acid solution, it passes over at 190° under 0.05 mm. pressure. On using 3.7 dibromo-iminobenyl, 3.7-dibromo-5-(carbo-γ-dimethylamino-propoxy)-iminodibenzyl is obtained in an analogous manner.

*Example 2*

Phosgene is introduced at room temperature into a suspension of 38.6 parts of iminostilbene in 200 parts by volume of toluene until all the starting material has dissolved and then phosgene is introduced for a further half hour at the boil. On cooling the reaction solution, the 5-chlorocarbonyl-iminostilbene crystallises out. It melts at 168–169°.

12 parts of this chloride are dissolved in 50 parts by volume of abs. benzene, 15 parts by volume of dimethylaminoisopropanol are added and the whole is refluxed for 16 hours. The reaction solution is then cooled, extracted with 2 N-hydrochloric acid, the hydrochloric acid solution is made alkaline with concentrated caustic soda lye and the precipitated base is filtered off under suction. On recrystallising from alcohol the 5-(carbo-dimethylamino-isopropoxy)-iminostilbene (5-dibenzo[b.f]azepine-5-carboxylic acid dimethylamino-isopropyl ester) melts at 84°.

On using diethylamino ethanol, 5-(carbo-diethylaminoethoxy)-iminostilbene (5-dibenzo[b.f]azepine-5-carboxylic acid diethylaminoethyl ester) is obtained in an analogous manner. The crude base is converted with alcoholic hydrochloric acid into the hydrochloride which crystallises well. M.P. 230°.

In an analogous manner as described in the above examples, the following compounds are obtained:

5-(carbo-pyrrolidino-ethoxy)-iminodibenzyl (M.P. 86°),
5-(carbo-pyrrolidino-ethoxy)-iminostilbene,
5-(carbo-piperidino-ethoxy)-iminodibenzyl or -iminoostilbene,
5-(carbo-piperidino-propoxy)-iminostilbene (M.P. of the hydrochloride 240–242°),
5-(carbo-piperidino-propoxy)-iminodibenzyl,
5-(carbo-morpholino-ethoxy)-iminostilbene (M.P. of the hydrochloride 202°),
5-(carbo-morpholino-ethoxy)-iminodibenzyl (M.P. of the hydrochloride 248°),
5-(carbo-morpholino-propoxy)-iminodibenzyl (M.P. of the hydrochloride 180°),
5-(carbo-morpholino-propoxy)-iminostilbene.

What we claim is:

1. A member selected from the group consisting of an N-heterocyclic compound of the formula

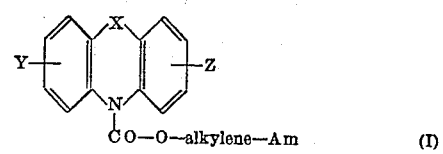

wherein X represents a member selected from the group consisting of the ethylene and vinylene group, Y and Z represent a member selected from the group consisting of hydrogen and halogen atoms, Am represents a member selected from the group consisting of lower dialkylamino, pyrrolidino, piperidino and morpholino, and alkylene represents an alkylene radical having at least two and at most four carbon atoms, and the hydrochlorides thereof.
2. 5-(carbo-pyrrolidino-ethoxy)-iminodibenzyl.
3. 5-(carbo-pyrrolidino-ethoxy)-iminostilbene.
4. 5-(carbo-piperidino-ethoxy)-iminodibenzyl.
5. 5-(carbo-piperidino-propoxy)-iminostilbene.
6. 5-(carbo-piperidino-propoxy)-iminodibenzyl.

References Cited in the file of this patent
UNITED STATES PATENTS 2,811,520    Gaillot et al. _____ Oct. 29, 1957

FOREIGN PATENTS 798,053    Great Britain _____ July 16, 1958